April 30, 1968     D. S. COOK     3,380,208
ELECTRICAL FLOOR DUCT ADAPTOR FITTING
Filed June 16, 1966     2 Sheets-Sheet 2
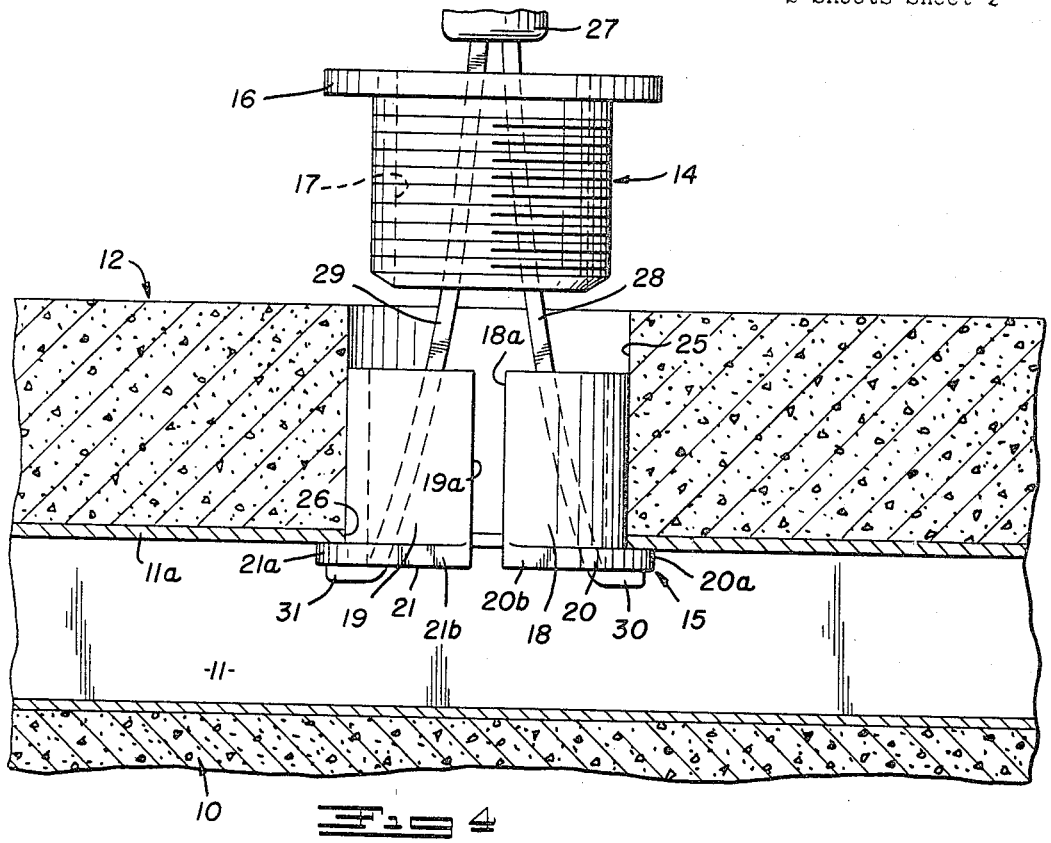
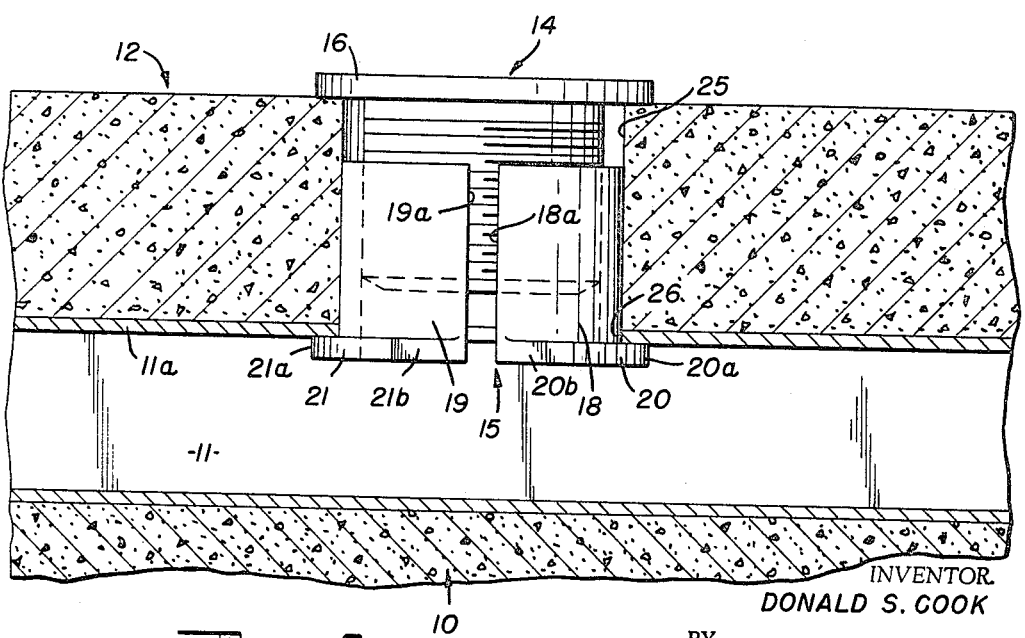
INVENTOR.
DONALD S. COOK
BY
MAHONEY, MILLER & RAMBO
ATTORNEYS 3,380,208
ELECTRICAL FLOOR DUCT ADAPTOR FITTING
Donald S. Cook, 31 Hiawatha Ave.,
Westerville, Ohio 43081
Filed June 16, 1966, Ser. No. 558,123
2 Claims. (Cl. 52—221)

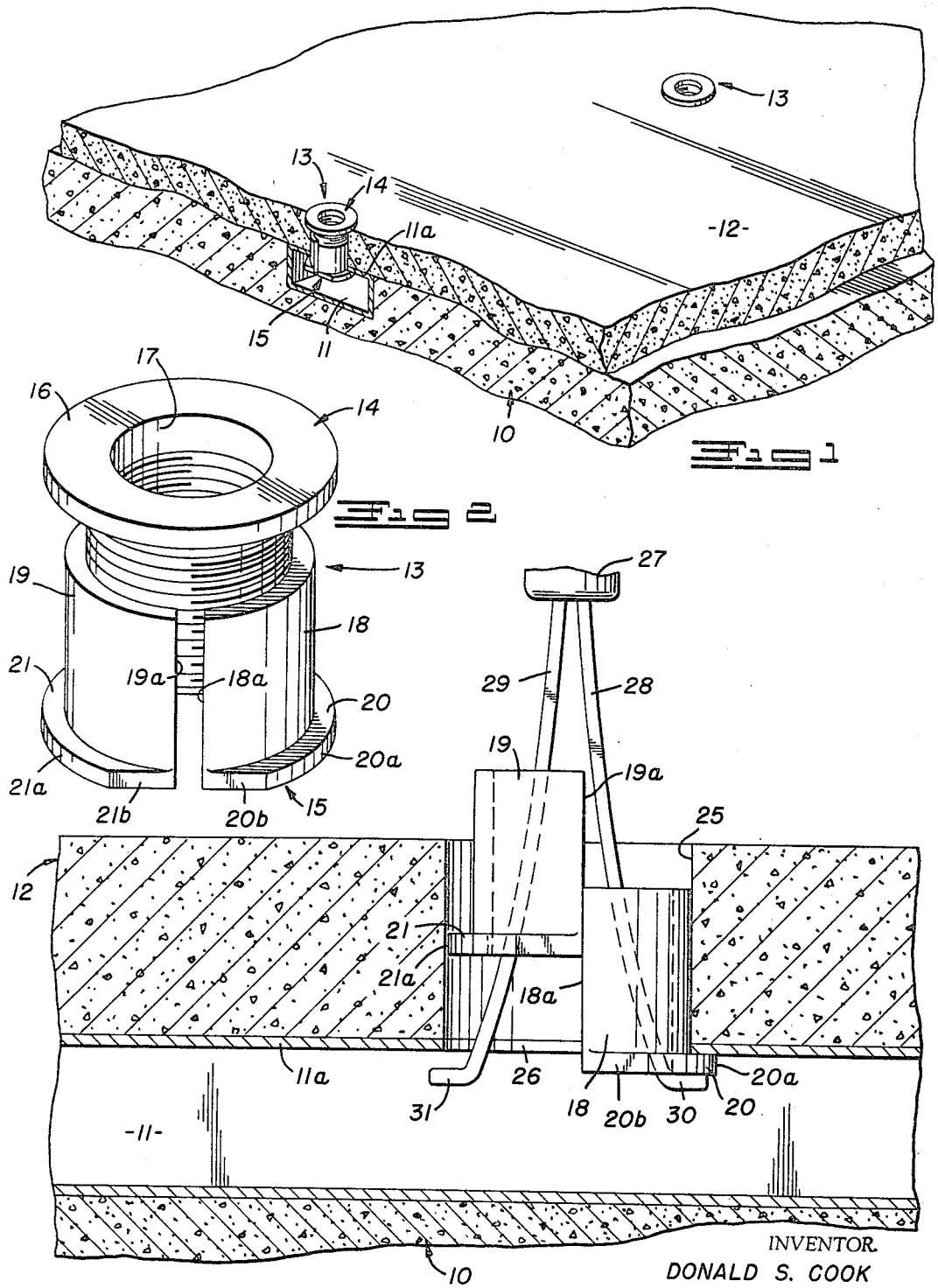

ABSTRACT OF THE DISCLOSURE

An adaptor fitting adapted to be positioned in an opening in an electrical duct embedded in a floor comprising a split or sectional retainer sleeve assembly with a flange arrangement for engaging the opening when a cooperating adaptor bushing is positioned therein. Removal of the adaptor fitting is possible by first removing the bushing and then removing the retainer sleeve assembly.

Prior art and objects of the invention

It is a well known practice to install lighting or electrical power distribution systems in industrial plants, and particularly, in office spaces, by means of metallic conduits or raceways which are embedded in the floor structures. These elongated conductor conduits may be provided with permanent outlet or adaptor fittings at selected locations. However, it is desirable that means be provided to permit installation of adaptor fittings at other locations as dictated by the needs of the office space. Consequently, adaptor fittings have been devised to permit their installation at desired points along the conduit or raceway. Such prior art adaptor fittings as are known, however, are difficult to install and are not readily removable when no longer required at a specific location. One type of adaptor fitting constructed in accordance with the prior art is designed to be driven into an opening formed in the floor at the desired location and may only be removed by further destruction of the floor structure. Another type of adaptor fitting embodying a prior art construction is of the type which is inserted in a preformed opening in the floor and is operable to effect a wedging, laterally-directed force against the floor structure. Although this latter type may be more readily removed, it is relatively more difficult to install as it requires a specifically shaped opening which is difficult to form.

It is, therefore, the primary object of this invention to provide an adaptor fitting for electrical floor duct which may be readily installed in a circular opening formed in the floor structure and which may be readily removed after being installed.

It is another object of this invention to provide an adaptor fitting which may be readily installed in a circular opening in a floor through compressive clamping of opposed surfaces of the floor structure.

It is a further object of this invention to provide an adaptor fitting which provides a positive electrical contact with the buried electrical conduit or raceway.

It is also an object of this invention to provide an adaptor fitting which may be readily installed in a blind hole and which may be subsequently removed without destruction of the surrounding floor structure.

These and other objects and advantages of the present invention will be readily apparent from the following detailed description of an embodiment thereof and the accompanying drawings.

In the drawings:

FIGURE 1 is a fragmentary, perspective view of a floor structure provided with a buried electrical floor duct illustrating the installation of adaptor fittings embodying this invention.

FIGURE 2 is an enlarged perspective view of an adaptor fitting disposed in assembled relationship.

FIGURE 3 is a vertical sectional view of a floor structure and electrical floor duct illustrating the initial stage of installing the adaptor fitting of this invention.

FIGURE 4 is a similar vertical sectional view of a floor structure showing a subsequent stage in the installation of an adaptor fitting.

FIGURE 5 is a similar vertical sectional view of a floor structure with an adaptor fitting completely installed.

Having reference to the drawings, a typical installation of the adaptor fitting is shown specifically in FIGURE 1 in connection with a typical floor structure. Such a floor structure includes a base or sub-floor 10 which may be of concrete material. During the pouring of the sub-floor 10, an elongated electrical raceway or conduit 11 is positioned to be embedded in the concrete material with the upper wall surface 11a of the conduit exposed. After the sub-floor 10 has hardened and during the finishing of the structure, a finished floor 12, which may also be of concrete, is placed over the sub-floor. The finished floor 12 will also completely cover the conduit 11 and may be installed without permanent type adaptor fittings being positioned in association with the conduit. Subsequent to completion of the floor surfaces or at a later time, it may be desired to add or change the location of adaptor fittings which communicate with the electrical floor duct or conduit 11. This is advantageously accomplished by utilizing the improved adaptor fittings of this invention which are designated generally by the numeral 13 with two such adaptor fittings shown installed in the section of floor illustrated in FIGURE 1.

The construction of the adaptor fitting 13 is shown in detail in the enlarged perspective view of FIGURE 2. This adaptor fitting comprises an adaptor bushing 14 which is adapted to be detachably engaged by a retainer sleeve assembly 15. The adaptor bushing 14 comprises a main body of elongated, cylindrical shape having an external screw-thread formed on a portion thereof. Also formed with the bushing 14 at one end thereof is an annularly shaped, laterally projecting flange 16. This flange is formed at one end of the main body of the bushing and extends a distance outwardly therefrom for engagement with an opposed surface of the finished floor 12. An open-ended, axially extending bore 17 is also formed in the bushing to facilitate installation of the adaptor fitting and provide a passageway for the electrical conductors from the conduit 11 to a suitable outlet or receptacle (not shown). Such a receptacle or outlet may be provided with a screw-threaded base and the interior of the bore 17 may be formed with a screw-thread for engagement with the receptacle.

The retainer sleeve assembly 15 of the present embodiment of the invention is formed by two complementally shaped sections 18 and 19 which form an elongated, cylindrical tube when disposed in assembled relationship with the adaptor bushing 14. Each section 18 and 19 comprises a section of a cylinder wall which is slightly less than one-half of the cylinder as divided along the longitudinal axis with a portion of the cylinder wall being removed at diametrically opposed positions resulting in the opposed longitudinally extending edges 18a and 19a of the respective sections being spaced apart a predetermined distance. Complemental portions of a screw-thread are formed on the interior surfaces of the respective sections 18 and 19 to permit threaded engagement of the sections with the threaded portion of the adaptor bushing 14. Each of the sections 18 and 19 is provided with an outwardly projecting flange 20 and 21 which is formed at the lower end of the respective section. These flanges 20 and 21 are adapted to engage the lower surface of the finished floor or an inner wall surface of an upper conduit wall 11a. Installation of the adaptor fitting is best shown in FIGURE 5 where the flanges 20 and 21 are shown in engagement with the upper conduit wall 11a and the flange 16 of the adaptor bushing 14 is in contacting engagement with the upper surface of the finished floor 12. In the present embodiment, flanges 20 and 21 comprise segments of an annular flange which project a distance laterally outward from a surface of the cylindrical walls of the respective sections 18 and 19. Each flange 20 and 21 is formed with an outer peripheral edge 20a and 21a having a radius of curvature which is substantially equal to the radius of curvature of the outer surface of either section 18 or 19. The distance which the peripheral edges 20a and 21a are displaced from the external cylindrical surface of the respective section, is equal to the spacing between the edges 18a and 19a of the sections when the sections are assembled with the adaptor bushing 14. Each arcuate peripheral edge portion 20a and 21a, respectively, of the flanges terminates in a straight-sided portion 20b and 21b at either side of the section, which is normal to a line intersecting the longitudinal edges 18a or 19a of the respective sections. This specific construction and formation of the flanges 20 and 21 permits the sections 18 and 19 to be inserted in a cylindrical hole which is substantially equal to the diameter of the sections when assembled with the adaptor bushing 14.

Installation of an adaptor fitting 13 embodying this invention is illustrated in FIGURES 3, 4 and 5. The first step in the installation process consists of locating the proposed position of the adaptor fitting relative to the conduit 11 and forming a cylindrical hole 25 in the finished floor 12 by a suitable tool, such as a conventional hole saw, with the diameter of the hole being the same as the diameter of the retainer sleeve. An aperture 26 of the same diameter as the hole 25 is also formed in the upper conduit wall 11a to coincide with the hole 25. After formation of the hole 25 and aperture 26, one section of the retainer sleeve, such as 18, is inserted through the opening and positioned therein, as shown in FIGURE 3, to place the flange 20 in engagement with the upper conduit wall 11a and the cylindrical wall surface of the section in contacting engagement with the surface of the hole 25. The specific shape of the flange 20 permits the section 18 to be inserted through the hole 25 from the top surface of the floor 12 as the section may be transversely displaced relative to the central axis of the hole axis section 19. In order to facilitate the installation of the adaptor fitting, a tool having a handle 27 and a pair of resilient arms 28 and 29 which are biased to the position shown in FIGURE 3 may be used to advantage. Each arm 28 and 29 is formed with a laterally projecting lip 30 and 31 at the free end and which are adapted to project under a respective one of the flanges 20 and 21 of the sections in supporting relationship thereto. With the tool thus positioned in the hole 25, as shown, the section 18 is placed in the hole in the desired position shown in FIGURE 3 and is retained by the arm 28 and its lip 30 in contacting engagement with the surfaces of the hole 25 and the upper conduit wall 11a. Subsequent to the positioning of the section 18, the section 19 may be inserted in the hole 25 by positioning section 19 with the longitudinal edges 19a aligned with and in contacting engagement with the longitudinal edges 18a of section 18 and pushing the section 19 downwardly through the hole 25. The shape of the flange 21 is such that the outer periphery 21a will thus conform to the interior cylindrical surface of the hole 25 and aperture 26 and thus permit passage of the section 19 through the hole 25 into the position shown in FIGURE 4 similar to the section 18 and supported by the arm 29 and associated lip 31 in contacting engagement with the finished floor 12 and the conduit wall 11a. After both sections 18 and 19 of the retainer sleeve assembly 15 have been properly positioned in the hole 25 and aperture 26, the adaptor bushing 14 is slid down over the handle 27 of the tool, as shown in FIGURE 4. The screw-threaded portion of the adaptor bushing 14 is engaged with the threaded sections 18 and 19 of the retainer assembly and is turned to bring the flange 16 into contacting engagement with the upper surface of the finished floor 12, as shown in FIGURE 5. This completes the installation of the adaptor fitting which now securely clamps the finished floor 12 and the conduit wall 11a between the opposed portions of the flange 16 of the bushing 14 and the flanges 20 and 21 of the sections 18 and 19 forming the retainer sleeve 15. The necessary electrical conductors may then be passed through the adaptor fitting and connected to a suitable outlet or receptacle which may be secured in threaded engagement with the screw-threads formed in the central bore 17 of the adaptor bushing 14.

At any time that it is desired to abandon the electrical outlet or receptacle location, the adaptor fitting 13 may be readily removed by reversing the installation procedure. This is accomplished by inserting the tool through the center bore 17 of the bushing 14 to engage the sections 18 and 19 of the retainer sleeve and unthreading the bushing for its removal. After removal of the bushing 14, the retainer sleeve sections 18 and 19 may be removed in succession in a manner similar to their insertion in the hole 25 and aperture 26. Subsequently, if desired, or necessary, the hole 25 may be filled with concrete to complete the removal operation.

It is readily apparent from the foregoing description of an embodiment of this invention that the adaptor fitting provided may be readily installed in an existing floor construction having electrical floor duct and may be removed when desired. The adaptor fitting is rigidly secured in the hole formed in the floor for this purpose through clamping engagement of the floor structure and the electrical conduit wall. This clamping engagement produces only a compressive stress on the floor and the contacting engagement of the flanges of the retainer sleeve assembly with the conduit wall 11a forms an electrical ground for the outlet or receptacle which is installed in the adaptor fitting.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. An adaptor fitting for electrical floor duct comprising an adaptor bushing having a main body of elongated, cylindrical shape with a screw-thread formed on a portion of the exterior surface and an open-ended, axially extending bore, and a laterally projecting flange formed with said main body and which extends a distance outwardly from the peripheral surface of said main body for engagement with an abutting surface, and a retainer sleeve assembly detachably engageable with said adaptor bushing and which includes at least two complemental sections of elongated channel form which form a cylindrically-shaped tube when disposed in assembled relationship with said adaptor bushing, said sections having longitudinal edges which are spaced a predetermined distance from respective opposed edges of an adjacent section when disposed in assembled relationship, each of said sections having formed on the interior thereof complemental portions of a screw-thread for threaded engagement with said adaptor bushing, at least one of said sections having a flange which projects laterally outward from the outer peripheral surface thereof for engagement with an abutting surface, said section flange being formed with a peripheral edge which will permit passage through an opening having a diameter equal to the diameter of said retainer sleeve assembly when assembled with said adaptor bushing, the maximum width of said section flange being equal to the spacing of the opposed longitudinal edges of said sections when said sections are assembled with said adaptor bushing.

2. An adaptor fitting for electrical floor duct comprising an adaptor bushing having a main body of elongated, cylindrical shape with a screw-thread formed on a portion of the exterior surface and an open-ended, axially extending bore, and a laterally projecting flange formed with said main body and which extends a distance outwardly from the peripheral surface of said main body for engagement with an abutting surface, and a retainer sleeve assembly detachably engageable with said adaptor bushing and which includes at least two complemental sections of elongated channel form which form a cylindrically-shaped tube when disposed in assembled relationship with said adaptor bushing, said sections having longitudinal edges which are spaced a predetermined distance from respective opposed edges of an adjacent section when disposed in assembled relationship, each of said sections having formed on the interior thereof complemental portions of a screw-thread for threaded engagement with said adaptor bushing, at least one of said sections having a flange which projects laterally outward from the outer peripheral surface thereof for engagement with an abutting surface, said section flange being formed with a peripheral edge which will permit passage through an opening having a diameter equal to the diameter of said retainer sleeve assembly when assembled with said adaptor bushing, said peripheral edge of said section flange having a central portion which does not project beyond an arcuately curved line having a radius of curvature equal to the radius of curvature of the outer peripheral surface of said section with the maximum width of said section flange less than the spacing of the opposed longitudinal edges of said sections when said sections are assembled with said adaptor bushing.

References Cited

UNITED STATES PATENTS

| | | | |
|---|---|---|---|
| 522,005 | 6/1894 | Burke | 285—210 |
| 1,043,230 | 11/1912 | Henderson | 285—210 |
| 1,758,387 | 5/1930 | Anderson | 16—108 X |
| 2,097,374 | 10/1937 | Kennedy | 285—209 |

HENRY C. SUTHERLAND, *Primary Examiner.*

ALFRED C. PERHAM, *Examiner.*